United States Patent Office 3,830,947
Patented Aug. 20, 1974

3,830,947
PREPARATION OF CREAMED COTTAGE CHEESE
Lawrence L. Little, Creve Coeur, Mo., assignor to The Battelle Development Corporation, Columbus, Ohio
No Drawing. Continuation-in-part of abandoned application Ser. No. 796,207, Feb. 3, 1969. This application Mar. 3, 1971, Ser. No. 120,716
Int. Cl. A23c *19/00*
U.S. Cl. 426—361         16 Claims

ABSTRACT OF THE DISCLOSURE

Creamed cottage cheese is made by adding a creaming mix to dry cottage cheese curd, the creaming mix being made by adding a colloid former to cream and acidifying the cream to a pH below 5 before pasteurizing, while heating to pasteurizing temperatures, or before cooling below pasteurizing temperatures.

PRIOR APPLICATIONS

This application is a continuation-in-part of my pending application Ser. No. 796,207 now abandoned, filed Feb. 3, 1969, and entitled "Method for Making Creamed Cottage Cheese."

BACKGROUND

Creamed cottage cheese is more susceptible to early spoilage and short life than any of the other dairy products which are produced in large volume. The normal shelf life expectancy of the product is about two weeks. Most dairies code their creamed cottage cheese to be picked up at the end of two weeks. This requires considerable effort and diligence through all phases of storage, transportation, and display in the merchandising cabinets. A product return of about 12 to 15 percent is average throughout the industry, and represents a substantial economic loss amounting to approximately 120,000,000 pounds of creamed cottage cheese lost each year through spoilage.

While this loss is substantial, the lost business resulting from consumers being sold spoiled cottage cheese is even greater. The per capita consumption of creamed cottage cheese has been declining while the per capita consumption of other popular cheeses has been rising. Most dairy authorities attribute such loss to the inability of cottage cheese manufacturers to consistently deliver a high quality product.

Cottage cheese curd is normally cooked to a temperature of 125° F. or above, and, at the pH of 4.50–4.60 that prevails at the end of the cooking period, the curd is effectively pasteurized and very low in micro-organisms. It is common practice to chlorinate the rinse water with about 10 parts per million of chlorine which lowers the pH of the water to from about 5.0 to 6.0. The chlorine is active and effectively sterilizes the rinse water. Thus, the cottage cheese curd is cooked and washed under positive sanitary conditions and is of excellent sanitary quality when it is creamed. Furthermore the pH of the dry curd is usually around 4.60 to 4.80, which effectively inhibits the growth of psychrophilic organisms at refrigeration temperatures. Dry cottage cheese curd has excellent keeping quality and can be stored for 5 to 6 weeks under refrigeration. However, after the curd is creamed it deteriorates rapidly even under ideal refrigeration.

Yeasts and molds will grow profusely on cottage cheese, both the dry curd and the creamed product. Both of these types of micro-organisms are destroyed by pasteurization, and they are a problem only when they are allowed to contaminate dry curd, the creaming mixture, or the creamed cottage cheese after pasteurization. Since yeasts and molds are so destructive to the keeping quality of both dry and creamed cottage cheese, and their presence is due entirely to contamination resulting from unsanitary environment, equipment, or technique. Virtually all dairies have brought this phase of sanitation under control. Hence, yeast and molds are not a serious cause of early spoilage in creamed cottage cheese.

The cream dressing for cottage cheese is usually pasteurized just before use. Also, it is usually pasteurized at a temperature slightly higher than that used for milk in order to get a little higher percentage kill. The pasteurized cream is of a very fine sanitary quality, with a total culture count of usually only a few hundred, and rarely more than 3,000 to 5,000 per mil. Of the organisms remaining after pasteurization, there are no yeast and mold and virtually no lactic acid producing types. The remaining organisms are mostly thermoduric (capable of surviving temperatures somewhat above pasteurization temperature) and are largely proteolytic types. These organisms break down the protein, producing a wide variety of putrefactive flavors such as fruity, nutty, musty, acrid, etc. that are distinctly unpleasant and offensive flavors in cottage cheese. Most important, many of these bacteria are also psychrophilic, that is they grow actively at refrigeration temperatures. So, while the number of micro-organisms present in the creamed cottage cheese may be very low at the time it is packed, thermoduric organisms may grow at refrigeration temperature and render the product unfit for human consumption in a few days. Since these organisms bring about very little change in the appearance of the product, there is nothing to warn the consumer not to eat the product. The result is that consumers in very large numbers inadvertently eat spoiled creamed cottage cheese.

There are two ways to retard the growth of psychrophilic bacteria in creamed cottage cheese and thereby delay putrefactive spoilage. These are:

(1) The addition of chemical preservatives such as potassium sorbate, sodium benzoate, etc., to the cottage cheese or the creaming mix.

(2) Acidifying the cream dressing used to cream the dry cottage cheese curd to a pH below 5.0 (psychroliphilic bacteria are effectively inhibited at a pH below 5.0).

Number (1) is prohibited by the Food and Drug Administration and virtually all state and city health departments. To permit the use of chemical preservatives in a fresh dairy product such as creamed cottage cheese, which is such a nutritious and ideal media for the growth and habitation of all types of pathogenic micro-organisms, would inevitably lead to negligence and the relaxing of sanitary procedures to the point that contamination and infestation of the product would be so extensive that the chemical preservatives would not protect the consumers' health.

Number (2) is the ideal solution of this problem; however, technological obstacles have prevented its use. When a pasteurized and homogenized cream is acidified to a pH below 5.0, coagulation inevitably results in a short time. Even if the acidified cream is agitated or homogenized so as to break up the coagulation into a smooth fluid product, the viscosity is so high that the cream will not properly penetrate the dry cottage cheese curd. For this reason, it has not previously been practical to acidify a cream dressing for cottage cheese sufficiently to retard spoilage without developing so much viscosity that it is unfit for the purpose.

For example, a desirable creaming mix for cottage cheese curd is ordinary sour cream. Such a product whether made by conventional culturing or direct acid addition possesses a relatively low pH (about 4.6) and consequently exhibits excellent keeping qualities. Further, the tart flavor of the acidified product is a preferred characteristics of the average consumer. However, the viscosity of sour cream as measured by centipoises is generally within the range of from about 50,000 to 100,000 and such a high viscosity product is exceedingly difficult to successfully mix with dry curd to form a creamed cottage cheese product. A preferred viscosity for a creaming mix is one which measured in centipoises would be less than about 15,000.

Fresh cream has a pH of about 6.40–6.60, and when added to dry cottage cheese curd, the resulting pH of the creamed cottage cheese is about 6.40–6.20. The result is a very mild, bland, virtually tasteless product. Taste panel surveys have proven that most consumers prefer a more tart flavorful cottage cheese, and are turning to the more flavorful cheese, cheese spreads, sour cream, party dips, etc. This also contributes to the decline in per capita consumption of creamed cottage cheese which is nutritionally the best balanced food of all dairy products.

Diacetyl and starter distillate preparations are widely used in cottage cheese dressings to enhance flavor, however, their effectiveness is minimal. Diacetyl and other volatile constituents of starter distillate are produced along with lactic acid in the bacterial fermentation of cultured dairy products, and they are definitely a part of the overall rounded cultured flavor. However, these compounds are only a very small part of the overall culture flavor and are of only very slight benefit when used alone particularly in the pH range of 6.20–6.40.

In attempting to acidify the cream dressing for cottage cheese to a pH below 5.00 and retard the growth of psychrophilic bacteria, dairy research workers found that they could acidify the cream dressing to a pH of about 5.20 to 5.50 without bringing about coagulation of the cream which effects an unacceptably high viscosity. Although this pH is virtually ineffective in retarding the growth of psychrophilic bacteria at refrigeration temperature, it does make a definite improvement in the flavor of creamed cottage cheese, especially when accompanied by the addition of diacetyl, acetaldehyde, and volatile organic acids such as acetic acid, propionic acid, butyric acid, etc. Consequently, the partial acidification of cream dressing for cottage cheese with acid-flavor solutions to a pH in the range of 5.20–5.80 is widely practiced in the industry.

THE INVENTION

I have discovered a new technique for acidifying cream dressing for cottage cheese to a pH of 5.0 or below with a controllable increase in viscosity. The viscosity can be accurately and positively controlled so as to meet the requirements of manufacturers desiring a low viscosity cream dressing of about 300 centipoises or less and those desiring a high viscosity cream dressing of about 600 centipoises or over. Also, by employing my method when the cream dressing is acidified to a pH below about 5.00 with an acid-flavor solution, the creamed cottage cheese has a much more "cultured type flavor" than when partially acidified to a pH of only 5.20–5.80. Also, when employing my method there is no lower limit to the pH to which the cream dressing can be lowered that will necessarily cause an excessive increase in viscosity. Actually when employing my method there need be virturally no change in the viscosity of the cream dressing from pH 4.95 to 3.50. Taste panel evaluations have confirmed enthusiastic consumer preference of creamed cottage cheese acidified to a pH of 4.95–4.60 with acid-flavor solution over that only partially acidified with acid-flavor solution to a pH in the range of 5.20–5.80.

I have discovered that the viscosity of acidified cream can be controlled by making the acid addition prior to any heat treatment to pasteurizing temperatures or during such heat treatment and prior to cooling below pasteurizing temperatures of about 160° F.

There are two preferred steps in my process of acidifying cream dressing for cottage cheese to a pH below 5 without producing excessive viscosity:

(1) A hydrophilic colloid or colloid forming material is added to the product and subsequently agitated until the additive becomes soluble or hydrated in the product prior to the addition of the acid.

It is generally preferred to add the colloid or colloid former to the product at, or near, refrigeration temperatures.

(2) An acid or acid-flavor solution is added to the product in sufficient quantity to reduce the pH of the product to below 5.00 (preferably to within the range of 3.50 to 4.95). It is preferred to add the acid or an acid-flavor solution to the product at, or near, refrigeration temperatures. However, if it is desired to vary the viscosity of the cream dressing from low viscosity (less than 300 centipoises), to medium viscosity (300–600 centipoises), to heavy viscosity (600 centipoises and over) to meet local consumer preferences the acid addition is made at graded elevated (above refrigeration) temperatures.

Basically, the lower the temperature at which the product is acidified, the lower the viscosity of the final product. Thus, it is preferred to add the acid while the cream or milk is at a temperature below ambient and above freezing (125° F.–33° F.). The lowest possible viscosity is obtained by acidifying at 40° F. or lower. As the product is heated and the temperature of the product is raised, the higher the temperature at which the acid is added, the higher will be the viscosity of the final product.

However, the rate of heating and the holding time at the higher temperatures before the acidification step are also very dynamic factors affecting the viscosity. As the temperature of the product is raised above about 33° F., the higher the temperature at which the acidification takes place, and the longer it takes to reach this temperature and/or the longer it is held at that temperature before the acidification step takes place, the higher the viscosity of the final product.

By practicing my discovery a high fat content milk or cream can be acidified to a pH below 5.00 while obtaining a viscosity that is below about 15,000 centipoises (as measured at 40° F.). Such a low viscosity is ideal for creaming dry cottage cheese curd while high acidity immeasurably improves the keeping qualities of the creamed product while simultaneously improving its taste.

I have found that the stiffness of the acidified cream in direct acid processing is related to the heat treatment of the cream (i.e., for purposes of pasteurization or homogenization) that takes place immediately prior to acidification. In normal direct-acid processing homogenization and pasteurization takes place prior to acidification and under these circumstances the resultant product exhibits maximum viscosity (50,000–100,000 centipoises). I have found that if the acid addition is made prior to or during the heat treatment step the viscosity of the final product can be controlled. By following my procedure creams of the type commonly used in creaming mixes for cottage cheese (having butterfat contents ranging from 6 to 20 percent, by weight, usually within the range of 10–18 percent) may be acidified to a pH of 5 or below while retaining viscosities well below 50,000 centipoises (usually below 15,000 centiposes and as low as 200 centiposes).

I have found that the ultimate viscosity attained is related to both the temperature at which the acid addition is made and the time the cream is held at the temperature of acidification. Where acidification is effected at temperatures below about 160° F. the resultant product will possess viscosities below 15,000 centipoises regardless of how long the cream is held at the low temperature prior o making the acid addition. Where the pasteurizing (or homogenizing) temperatures are about 160° F. or above both the temperature at which acidification takes place and the time the milk is held at the temperature at which acidification takes place has a profound effect on the viscosity of the ultimate product. The higher the temperature at which the cream is acidified the greater the viscosity of the ultimate product. Also, generally the longer the period of time the cream is held at a given temperature prior to acidification the higher the viscosity will be for the ultimate product.

Animal milk (including cream) is a complex solution or emulsion containing minerals and acid buffering materials that vary somewhat in accordance with the exact geographical location of the animals from which the milk is obtained and the precise diet to which they are subjected. Accordingly the precise reaction of milk or cream to heat treatment and acidification is not entirely predictable and varies in accordance with its source. Such is the case in respect to the present treatment. For example, different batches of cream that have the same lipoid (butterfat or substitutes for butterfat) content may be treated identically (acidified to the same pH at the same temperature and time) but the ultimate viscosity properties may vary widely. Thus, the ideal treatment in a given instance will depend on the location and source of the milk or cream. The problem, of course, is familiar to the skilled dairy technologist and it is within the scope of his expertise to solve.

As stated above, acidification will preferably take place prior to heat treatment to pasteurizing temperatures. However, it should be kept in mind that such heat treatment need not be the first pasteurizing heat treatment of the involved batch of milk since milk or cream may be derived from various sources having histories of one or more previous pasteurization treatments. Such heat treatment need merely take place after or during the acidification step. Where acidification takes place prior to heat treatment preferably such heat treatment will be effected immediately subsequent to making the acid addition and prior to consequential casein coagulation (thickening of the cream). It is safe to say that heat treatment can be delayed for as long as one hour after acidification at temperatures ranging from freezing up to pasteurizing temperatures (at least about 125° F.) without material effects on the viscosity of the resultant product.

The time at temperature after acidification while the product is at pasteurizing temperature does not materially affect the resultant viscosities and should be consistent with good pasteurizing practices. Practical considerations would dictate that such time should not exceed one hour and preferably should not exceed the maximum time at which the cream is held at a given temperature at 160° F. or above prior to acidification (see below).

For practical applications of the method of the present invention, it can be said that the benefits of the present invention can be enjoyed by effecting the acid addition at any temperature prior to or during heat treatment from just above freezing temperature of milk (32° F.) up to about 210° F. and that the cream may be held at the temperatures within the range of 160° F. to 210° F. for a period of time not exceeding thirty minutes prior to acidification without the resultant viscosity properties rising above about 15,000 centipoises. Higher temperatures (HTST, high temperature-short time) pasteurizing techniques (i.e., up to 300° F. and rapidly cooled) may be employed; however, milk or cream cannot be retained at these higher temperatures for longer than a few seconds without destruction of the protein content of the milk. Consequently, it may be said that in the preferred embodiment of the present invention the cream is acidified prior to the completion of heat treatment (before it begins or before it is completed) and that the cream should not be held at temperatures of about 160° F. or greater for a period of time longer than about one-half hour. Where this procedure is practiced the viscosity of cream containing as much as 20 percent butterfat will exhibit a viscosity of 15,000 centipoises or less even though its pH is below 5.

The broad aspects of the method of the present invention involve a method for making creamed cottage cheese wherein 6 to 20 percent, by weight, lipoid content cream is heat treated to a pasteurizing temperature. However, either during heat treatment or prior to such heat treatment, direct acid additions are made to the cream in amounts that will affect a pH that is no higher than 5. Such an acidification should take place within a time period of from 1 hour prior to heating to a pasteurizing temperature to within the maximum time of the following ranges that correspond to the highest temperature at which the cream is held prior to acidification:

| Temperature: | Maximum time, minutes |
|---|---|
| 125° F. to 180° F. | 60 |
| 180° F. to 200° F. | 45 |
| 200° F. to 210° F. | 30 |

Of course, the resulting low viscosity acidified cream is then added to cottage cheese curd in the conventional manner to effect creamed cottage cheese.

It will be understood that the time at temperature parameters of the present invention relate to the step of acidification after heating to a specified temperature. Where acidification has been effected prior to reaching the temperature of about 160° F. viscosities of 15,000 centipoises or less will be experienced regardless of the time the cream is held at temperatures above about 160° F. In a similar manner where acidification is effected at temperatures within the range of 160°–210° F., holding the cream at temperature after acidification will not materially alter the resultant viscosities (although practical considerations limit such times to one hour or less). Thus, the present invention consists of the discovery that the viscosity of acidified cream can be controlled and varied by effecting acidification of cream before it is subjected to heat treatment (defined as being subjected to temperatures above about 160° F.) or during heat treatment and by holding the cream at temperature for a predetermined period of time before acidification at temperatures above about 160° F. to effect a selective viscosity.

The discovery is particularly significant when applied to the manufacture of creamed cottage cheese since it enables one to provide an acidified (below a pH of 5), high butterfat content cream (sufficiently high to provide the required 4 percent, minimum, butterfat content of the creamed cottage cheese) that is thin (low viscosity) so that it may be easily blended with the dry curd. Due to the high acidity of the creaming mix the keeping qualities and taste characteristics of the creamed cottage cheese is greatly enhanced.

I have found that the higher the temperature at which one performs the step of acidification, the higher the ultimate viscosity of the cream. Also, greater viscosities are obtained when the cream is held for a specified period of time at higher temperatures than at lower temperatures. The heating rate is not of great significance since modern heat exchanging equipment generally enables one to raise the temperature of cream very rapidly; however, the heating rate (time for heating the milk to temperatures above about 160° F.) constitutes the equivalent of time at temperature prior to acidification where the rate of heating is slow. The heating rate becomes a factor in the viscosity of the final product where it takes longer than about five minutes to reach the temperature of acidification. Consequently, in the preferred embodiment of the present invention where the heating time is greater than about five minutes to total time of heating the milk to the temperature of acidification plus the total time the milk is held at the temperature of acidification but prior to acidification should not exceed about thirty minutes.

As stated above, acidification at higher temperatures (above about 160° F.) effects higher viscosities and for a given viscosity should be held at higher temperatures prior to acidification for shorter periods of time than at lower temperatures. Thus, at the lower temperatures of the 160° F.–210° F. range the cream may be held for time periods that exceed thirty minutes prior to acidification without fear that the ultimate viscosity of the creaming mix will exceed about 15,000 centiposes.

The following ranges of "time at temperature prior to acidification" are preferred ranges one should stay within to be assured a low viscosity (no greater than 15,000 centipoises) with high acidity (a pH below about 5.0):

| Temperatures: | Maximum recommended time prior to acidification, minutes |
|---|---|
| From 160° F. to 180° F. | 60 |
| From 180° F. to 200° F. | 45 |
| From 200° F. to 210° F. | 30 |

Although, as stated above, the time at temperature prior to acidification where the temperature is below about 160° F. does not have a significant effect on the resultant viscosities, practical considerations dictate times at pasteurizing temperatures (at least 125° F.) prior to acidification that are no greater than about one hour.

Twelve percent butterfat batches of dressing were maintained at a temperature of 40° F. They were removed from the refrigerator and placed under vigorous agitation. Twenty-five hundredths percent guar gum and 3.0 percent salt were added to each batch and agitation continued for ten minutes. Each batch was then placed in a water bath at 200° F. and heated very rapidly to acidification temperature. Agitation was continued for five minutes after acidification, then homogenized, cooled to 50° F., bottled, and held twenty-four hours at 40° F. before determining viscosity.

TABLE 1.—RAPID HEATING

| Batch number | Acidification temperature, ° F. | Time held at acidification temperature before acidification, minute | Viscosity (centipoises) |
|---|---|---|---|
| 1 | 43 | 0 | 213 |
| 2 | 90 | 0 | 238 |
| 3 | 140 | 0 | 400 |
| 4 | 190 | 0 | 500 |
| 5 | 190 | 30 | 3,500 |

The experiment was repeated, except that instead of placing the batches in a 200° F. water bath 10 minutes after adding the salt and guar gum, the batches were placed in a 60° F. water bath and heated slowly at a constant rate. The rest of the processing was the same as for Table 1.

TABLE 2.—SLOW HEATING

| Batch number | Acidification temperature, ° F. | Time held at acidification temperature before acidication, | Viscosity (centipoises) |
|---|---|---|---|
| 1 | 42 | 0 | 325 |
| 2 | 90 | 0 | 350 |
| 3 | 120 | 0 | 7,000 |
| 4 | 150 | 0 | 13,250 |
| 5 | 180 | 0 | 18,750 |

Any material that is capable of acidifying milk to the desired pH and which does not render the curd deleterious for human consumption may be employed as the acid addition. In addition to lactic acid, readily useable acids include hydrochloric acid, phosphoric acid, pyrophosphoric acid, citric acid, tartaric acid, fumaric acid, malic acid, adipic acid, succinic acid, and acetic acid. Many of the aforementioned acids are available commercially in specific food grades that are ideal for the present process. Such acids or acidifying materials should be employed in a relatively concentrated form and preferably should be of such concentration as to acidify the milk to prevent a thin, watery product. Preferably the acid addition will be of such a concentration as to not exceed about 7 percent of the weight of the milk. For the purpose of the present specification and claims, the meaning of the word "acid" and the term "edible acid" shall include materials that are capable of acidifying milk without undue dilution. For example, acidogens, such as D-glucono-delta-lactone, can be employed as the acid addition, and anhydrides such as succinic anhydride.

As set forth above, cottage cheese creaming mix is conventionally made from a 12 percent, by weight, butterfat cream and is used in quantities to meet minimum federal standards of 4 percent, by weight, butterfat cottage cheese. In a similar manner cream used in conjunction with the method and product of the present invention will generally contain about 12 percent, by weight, butterfat. However, since the viscosity of the product may be readily controlled, it is obvious that cream having as little as 6 percent, by weight, butterfat and as much as 20 percent, by weight, butterfat can be used. Products not meeting the minimum standard of 4 percent can be sold under a name other than "creamed cottage cheese" and may be preferred by some purchasers as a low calorie product. Products having greater than the 4 percent minimum butterfat can be sold as a "richer" premium grade of creamed cottage cheese.

Cream or milk containing fat substitutes such as vegetable oils substituted in part or wholly for the butterfat content of the cream can be used in the practice of the present invention. Such lipoid substitutes may consist of coconut oil, corn oil, safflower oil, etc. Creaming mixes made from these creams or from wholly artificial cream or milk can be used in making low calorie cottage cheese type products.

The term "colloid former" as it is used in conjunction with the present invention shall mean any substance that is capable of forming a colloid in milk or cream to act as an acid stabilizer as described in my U.S. Pat. No. 3,378,375.

Such colloid formers are preferably hydrophilic colloid formers such as the vegetable gums and gelatin. The quantity present is not critical but should amount to at least .05 percent and will seldom exceed about 1.50 percent, by weight, of the cream.

Where monodiglycerides are employed as bodying agents or lipoid substitutes it is preferred that they be the high mono monodiglycerides described in my U.S. Pat. No. 3,359,116 (having a mono to di ratio of at least 5:3). When used as a bodying agent high-mono monodiglycerides may be present in amounts up to 3.00 percent, by weight, of the cream. Starch may be partially or wholly substituted for the monodiglycerides as a bodying agent.

In the practice of the present invention acidification of the creaming mix takes place prior to heat treatment or pasteurization during heating or anytime prior to cooling below the pasteurization temperature. Such heat treatment or pasteurization may be accomplished by conventional means including HTST (high temperature—short time) where the temperature exceeds about 190° F. (up to 300° F.) but is held at the elevated temperatures only instantaneously. In controlling the viscosity it is preferred that the heat treatment or pasteurization does not exceed about 225° F. Homogenizing may be conveniently effected during heat treatment after the acid addition has been made.

When adding the creaming mix to the dry cottage cheese curd, it may be desirable to make the addition at pasteurizing temperatures (at least 125° F.). If the curd is first heated to a pasteurizing temperature (at least 125° F.) a more organism-free (sterile) product is obtained. Such a product may be packaged hot to effect sterile packing as well.

In the following illustrative examples the following two acid-flavor solutions were used:

FORMULA.—ACID-FLAVOR SOLUTION NO. 1

| Ingredient | Amount |
|---|---|
| Water | 76 gallons. |
| Citric acid, anhydrous | 231 pounds. |
| Glacial acetic acid | 7.75 gallons. |
| Acetaldehyde | 73 ml. |
| Diacetyl | 49 ml. |
| Total | 100 gallons. |

FORMULA.—ACID FLAVOR SOLUTION NO. 2

| Ingredient | Percent | 10 gallons |
|---|---|---|
| 88% lactic acid | 80.0000 | 30,280 ml. |
| Glacial acetic acid | 19.9232 | 7,540 ml. |
| Acetaldehyde | 0.0256 | 10 ml. |
| Diacetyl | 0.0512 | 19 ml. |
| Total | 100.0000 | 37,849 ml. |

Example No. 1.—Low Viscosity Cream Dressing

To 1000 gallons of milk-cream mixture containing 12.0 percent butterfat, at a temperature of 35° F., turn the agitator on high speed and add 0.25 percent guar gum and 3.00 percent salt. Allow to agitate for a few minutes until the salt is dissolved and the stabilizer dispersed, then add 1250 ounces of acid-flavor solution No. 1. Continue agitating for a few minutes, until the acid-flavor solution is uniformly mixed with the product. Start heating the product, heat to 143° F., and hold for 30 minutes. Homogenize at 1000 pounds pressure. The product will coagulate early and become so viscous that agitation is rather ineffective. However, the coagulation will soon break and the product will become smooth, thin, and very fluid.

The homogenized dressing may be added to the dry cottage cheese at the temperature it comes from the homogenizer, it may be cooled before adding to the curd, or it may be cooled to refrigeration temperature and stored under refrigeration for later use. In any event, add the dressing to the dry curd at the rate of 1 pound of dressing to 2 pounds of dry curd. The finished creamed cottage cheese will contain 4 percent butterfat (the minimum set by F.D.A standards) and 1.0 percent salt.

The above dressing will have a low viscosity, in the range of 200 to 300 centipoises, it will penetrate the dry curd well, and leave a minimum amount of fluid cream not adhering to the curd. In addition, it will be very smooth and creamy, and be very resistant to syneresis. It will have a pH of about 4.70.

Example No. 2.—Medium Viscosity Cream Dressing

To 1000 gallons of milk-cream mixture containing 12.0 percent butterfat, at a temperature of about 40° F., turn the agitator on high speed and add 0.25 percent guar gum and 3.00 percent salt. Turn the heat on slow and slowly warm the cream to 90° F. Turn the heat off and allow the dressing to set for 30 minutes with the agitator running on low speed. Then turn the agitator on high speed and add 1250 ounces of acid-flavor solution No. 1. Continue agitating for a few minutes until the coagulation is broken up and the cream is smooth and fluid. Start heating again, and heat to 143° F. and hold 30 minutes. Homogenize at 1500 pounds pressure. Use the dressing as described in Example No. 1. The dressing will have a medium viscosity, in the range of 300–600 centipoises, it will penetrate the dry curd well, and leave a minimum amount of fluid cream not adhering to the curd. In addition it will be smooth and creamy and be very resistant to syneresis. It will have a pH of about 4.70.

Example No. 3.—Heavy Viscosity Cream Dressing

To 1000 galons of milk-cream mixture containing 12 percent butterfat turn the agitator on high speed and add 0.25 percent guar gum and 3.00 percent salt. Start heating and heat to 143° F. Hold for 5 minutes, then add 1250 ounces of acid-flavor solution No. 1. Allow a few minutes for the coagulation to break up and the dressing to become smooth and fluid. Adjust the temperature to 143° F. and hold 30 minutes. Homogenize at 2500 pounds pressure.

Use the dressing as described in Example No. 1. The dressing will be heavy but fluid, with a viscosity in the range of 600 to 1200 centipoises. It will penetrate the dry curd well, and leave a minimum amount of fluid cream not adhering to the curd. In addition, it will be smooth and creamy and very resistant to syneresis. It will have a pH of about 4.70.

The viscosity of cottage cheese dressings made by my method is influenced by the homogenization pressure, so this provides an additional means of precisely regulating the viscosity. Minimum viscosity is obtained by using minimum pressure (300–500 pounds), and maximum pressure is obtained at about 2500 to 3000 pounds pressure. Normally there is about a 500 to 1000 centipose increase in viscosity from the minimum to maximum pressure.

Also, if for any reason a still higher viscosity product is desired, this can be easily obtained by using a higher level of hydrophilic colloid, or by incorporating body building agents such as high mono monoglycerides, starch, etc., as disclosed in U.S. Pat. No. 3,359,116.

However, it should be emphasized that the essence of this invention is a means of acidifying cream dressings to a pH below 5.00 without producing excessive viscosity. If my process produces too low a viscosity, there are many ways the viscosity can be increased.

Example No. 4.—Medium Viscosity Cream Dressing

To 1000 gallons of cream containing 16.0 percent butter-fat, warm to 90° F. and add 0.05 percent Furcelleran extract, Agitate for a few minutes until the stabilizer is dispersed, then add 1500 ounces of acid-flavor solution No. 1. Agitate until the dressing becomes smooth and fluid. Pasteurize at 168° F. for 16 seconds, homogenize at medium pressure (adjust the pressure to obtain the precise viscosity desired in the dressing) and cool to about 40° F. The cream will have a pH of about 4.55.

Add the dressing to the dry curd at the rate of 1 pound dressing to 3 pounds dry curd, add 1 percent salt (based on the combined weight of the cream and curd), mix thoroughly and package.

Example No. 5.—High Viscosity Cream Dressing

To 1000 gallons of milk-cream mixture containing 10.0 percent butterfat, add 0.25 percent Locust bean gum, 0.25 percent high mono monoglyceride, and 2.5 percent salt. Heat slowly to 160° F. and hold 5 minutes. Add 1750 ounces of acid-flavor solution. Homogenize at 2500 pounds pressure and add hot to the cold, dry cottage cheese curd at the rate of 1 pound of dressing to 1.5 pounds of curd. The dressing will have a pH of about 4.40 and will give the finished product a pronounced tangy, mellow flavor.

Blend the dressing with the dry curd and package. The finished cheese will contain 4.0 percent butterfat and 1.0 percent salt.

Example No. 6.—Polyunsaturated Vegetable Fat Filled Cream Dressing

To 7437 pounds of sweet cream buttermilk (fresh fluid, or reconstituted from sweet cream buttermilk powder) add 1014 pounds of Nectar vegetable fat (Procter & Gamble). Turn the agitator on high speed and add 17 pounds of guar gum and 254 pounds salt. Warm the mixture to 100° F. and continue agitating until the Nectar is melted. Then add 625 ounces of acid-flavor solution No. 2. Heat to 180° F. and hold 5 minutes. Homogenize at high pressure. Add to dry curd at the rate of 1 pound dressing to 2 pounds of dry curd, according to Example No. 1. The dressing will have a pH of about 4.70, and have a very creamy and tart flavor.

Although this dressing has an appeal because of economy, by far the greatest sales appeal is its substitution of polyunsaturated fat for butterfat.

Example No. 7.—Polyunsaturated Vegetable Fat Filled Creamed Dressing

To 7436 pounds of skim milk, add 1014 pounds of Nectar (Procter & Gamble), 8.5 pounds Furcelleran extract, 12.7 pounds soya lecithin, and 254 pounds of salt.

Heat to 125° F. and add 625 fluid ounces of acid-flavor solution No. 2, and heat to 150° F. Homogenize at 2500 pounds and add to dry cottage cheese curd that has been rinsed in 150° F. water and remains at a temperature of above 145° F. after draining. Add 1 part dressing to 2 parts dry curd and package hot. The creamed cottage cheese will pasteurize the package and will keep six months or more under refrigeration.

Example No. 8.—Filled Cream Dressing

To 7436 pounds of skim milk, add 1014 pounds of 76° coconut oil, add 20.0 pounds of guar gum, 15.0 pounds of commercial lecithin, and 254 pounds of salt. Heat to 135° F. rapidly, then add 1500 ounces of acid-flavor solution No. 1. Homogenize at medium pressure and add to dry curd as in Example No. 1.

Example No. 9.—Sterile Cream Dressing

To 8450 pounds of cream containing 12.0 percent butterfat, add 17.0 pounds of guar gum and 254 pounds of salt. Warm to 70° F. and add 1250 fluid ounces of acid-flavor solution No. 1. Agitate until smooth and heat to 245° F.–300° F. and cool to 160° F. Homogenize at 2500 pounds pressure and cool to 40° F. Add to dry curd at the rate of 1 part dressing to 2 parts dry curd. The dressing will be devoid of any psychrophilic organisms, and a pH of about 4.70. The creamed cottage cheese will have at least 10 to 12 week's shelf life under refrigeration.

I claim:

1. A method for making creamed cottage cheese comprising:
   (a) heat treating a 6 to 20 percent, by weight, lipoid content cream to a pasteurizing temperature;
   (b) making direct acid additions to said cream prior to cooling below pasteurizing temperatures in amounts to effect a pH no higher than 5 within a time period of from one hour prior to heating to a pasteurizing temperature to within the maximum time of the following ranges that correspond to the highest temperature at which the cream is held prior to acidification:

Temperature: Maximum time, minutes
   125° to 180° F. _____ 60
   180° F. to 200° F. _____ 45
   200° F. to 210° F. _____ 30 and (c) adding the acidified cream to cottage cheese curd.

2. The method of Claim 1 wherein from about 0.01 to 1.50 percent, by weight, of a colloid former is added to said cream prior to acidification.

3. The method of Claim 1 wherein said cream is acidified prior to heating above about 160° F°.

4. The method of Claim 1 wherein said cream is acidified after heating to above about 160° F., the total time the cream is above about 160° F. prior to acidification being no greater than thirty minutes so that the viscosity of the resultant mixture is below about 15,000 centipoises.

5. The method of Claim 4 wherein said temperature does not exceed about 210° F.

6. The method of Claim 1 wherein said cream is acidified after heating to above about 160° F., the total time said cream is held above 160° F. prior to acidification corresponding to the highest temperature reached being as follows:

Minutes
160° F.–180° F. _____ 60
180° F.–200° F. _____ 45
200° F.–210° F. _____ 30

7. The method of Claim 4 wherein said cream is heated rapidly to said pasteurizing temperature and is held at said temperature for a period of time that does not exceed thirty minutes prior to acidification.

8. The method of Claim 6 wherein said cream is heated rapidly to said highest temperature and is held at said temperature for a period of time that does not exceed the maximum time corresponding to that set forth for the temperature range in which the highest temperature falls prior to acidification.

9. The method of Claim 1 wherein said mixture is acidified to within a pH range of from about 3.50 to 4.95.

10. The method of Claim 1 wherein said mixture is homogenized prior to its addition to cottage cheese curd.

11. The method of Claim 2 wherein a bodying agent consisting of at least one material selected from the group of mono-diglycerides and starch is added to said cream prior to acidification.

12. The method of Claim 2 wherein said colloid former consists of a hydrophilic colloid former.

13. The method of Claim 2 wherein said colloid former consists of from .01 to 1.50 percent, by weight, of a hydrophilic colloid former and up to 3.00 percent, by weight, of mono-diglycerides having a mono to diglyceride ratio of at least 5:3.

14. The method of Claim 2 wherein said creaming mix is added to dry cottage cheese curd while both curd and mix are at a temperature of at least 125° F.

15. The method of Claim 2 wherein the colloid former consists essentially of from .01 to 1.50 percent, by weight, of at least one material selected from the group of vegetable gums and gelatine.

16. The method of Claim 15 wherein a bodying agent that consists essentially of at least one material selected from the group of mono-diglycerides and starch is added to said cream prior to acidification.

References Cited

UNITED STATES PATENTS

| | | | |
|---|---|---|---|
| 3,359,116 | 12/1967 | Little | 99—54 |
| 3,432,306 | 3/1966 | Edwards | 99—54 |
| 3,507,663 | 4/1970 | Starook et al. | 99—59 X |
| 3,117,870 | 1/1964 | Hussong et al. | 99—116 |

OTHER REFERENCES

Kosikowski, F., Cheese and Fermented Milk Foods, published by the author, Dept. of Food Science, Cornell University, Ithaca, N.Y., 1966 (pp. 93–95).

DAVID M. NAFF, Primary Examiner

U.S. Cl. X.R.

426—522